United States Patent
Kanaoka et al.

(10) Patent No.: US 6,860,763 B2
(45) Date of Patent: Mar. 1, 2005

(54) COMPONENT PARTS BOX FOR VEHICLE

(75) Inventors: Yoji Kanaoka, Saitama (JP); Katsuhisa Yamada, Saitama (JP); Yusuke Funayose, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 404 days.

(21) Appl. No.: 09/820,918

(22) Filed: Mar. 30, 2001

(65) Prior Publication Data
US 2001/0045776 A1 Nov. 29, 2001

(30) Foreign Application Priority Data
Mar. 30, 2000 (JP) .................................. 2000-093640

(51) Int. Cl.$^7$ .............................................. H01R 12/00
(52) U.S. Cl. ........................................................ 439/621
(58) Field of Search ................................. 439/621, 76.1, 439/76.2, 949, 34, 540.1, 954; 335/152, 162, 202; D13/160

(56) References Cited

U.S. PATENT DOCUMENTS

| 4,135,226 | A | * | 1/1979 | Kourimsky |  |
|---|---|---|---|---|---|
| 4,871,884 | A | * | 10/1989 | Hayashi | 174/52.1 |
| 5,179,503 | A | * | 1/1993 | Fouts et al. | 361/729 |
| 5,285,011 | A | * | 2/1994 | Shimochi | 439/621 |
| 5,915,978 | A | * | 6/1999 | Hayakawa et al. | 439/76.2 |
| 5,967,819 | A | * | 10/1999 | Okada | 439/949 |
| 6,178,106 | B1 | * | 1/2001 | Umemoto et al. | 363/146 |

FOREIGN PATENT DOCUMENTS

| DE | 44 39 426 C2 | 9/1996 |
|---|---|---|
| JP | B2740773 | 1/1998 |

* cited by examiner

Primary Examiner—Neil Abrams
(74) Attorney, Agent, or Firm—Birch, Stewart, Kolasch & Birch, LLP

(57) ABSTRACT

A large number of relays are concentrated in a limited space to utilize the space effectively. A relay box containing a large number of relays can be disposed in a narrow space between a rear fender and a seat bottom plate. The relays are mounted on three substrates within the relay box. Plural relays are arranged in a line on each of the substrates and the substrates are arranged in a stepped fashion like stairs. Therefore, the relay box is substantially in the shape of a parallelogram, and thus can be disposed in a narrow space along the rear fender of a vehicle. Conductors of the relays are drawn out along the rear fender.

18 Claims, 8 Drawing Sheets

COMPONENT PARTS BOX FOR VEHICLE

BACKGROUND OF THE INVENTION

1. Field of the Invention

The present invention relates to a component parts box for a vehicle and particularly to a component parts box for a vehicle suitable for accommodating a large number of vehicular component parts in a narrow space of a vehicle efficiently.

2. Description of Background Art

In vehicles such as automobiles and motorcycles, with an increase in the number of electrically controlled functions, a large number of relays have come to be used as component parts. If the relays are arranged planarly, the installation area becomes large, so it is difficult to install the relays in a narrow place such as inside or outside of a vehicle. Various layouts have been proposed so that a larger number of parts such as relays can be accommodated within an extremely limited space, e.g. the interior of a vehicle. For example, in an electric connector box described in Japanese Patent Publication No. 2740773, a large number of parts and circuits, including relays, are divided into a plurality of connecting blocks and the divided connecting blocks are arranged along the inner wall surface of an instrument panel, whereby a large number of relays can be accommodated in a suitable space.

Since the above conventional electric connector box is disposed planarly along the wall surface of the instrument panel, it is necessary to use the wall surface of the instrument panel over a wide area and it has so far not always been possible to ensure such a wide wall surface in an appropriate position. Moreover, in the case of positioning a relay box along a rear fender of a motorcycle, the following problem has been encountered.

FIG. 9 shows an example of the arrangement of a large number of relays along a rear fender of a motorcycle wherein a control unit is installed centrally of a vehicle body. In FIG. 9, a relay box 70 includes a plurality of relays that are divided into plural (two) sections, which are arranged along an outer periphery of a rear fender 71. Conductors 72 are drawn out from relays 73 contained in the relay box 70. The conductors 72 then extend downwardly along the rear fender 71 and are connected to a control unit 74. As can be seen from FIG. 9, in the case of arranging the relays 73 along the rear fender 71, the conductors 72 connected to the relays are different in length, so the wiring work for laying the conductors 72 beforehand in the relay box 70 is not rendered uniform and is complicated.

SUMMARY AND OBJECTS OF THE INVENTION

It is an object of the present invention to solve the above-mentioned problems and provide a component parts box for a vehicle capable of simplifying the wiring work without increasing the installation area.

For achieving the above-mentioned object, the first feature of the present invention resides in a component parts box for a vehicle, containing a plurality of component parts and a plurality of substrates for connecting terminals of the component parts. The plural substrates are arranged in line in a stepped manner like stairs and a plurality of the component parts are arranged in a line on each of the substrates so that their connecting terminals are opposed to the substrate.

The second feature of the present invention resides in a component parts box for a vehicle, wherein the component parts are each provided with a set of a plurality of connecting terminals. The connecting terminals are connected together to the associated substrate.

According to the above features, since the substrates are arranged in a stepped fashion, the component parts on the substrates are also arranged like stairs and hence the appearance of the components parts can also have a shape conforming to the external form of the component parts.

Therefore, even in a narrow space such as a corner portion of a narrow angle, if the degree of steps is set so as to match the corner angle, the box can be disposed by utilizing the limited corner space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
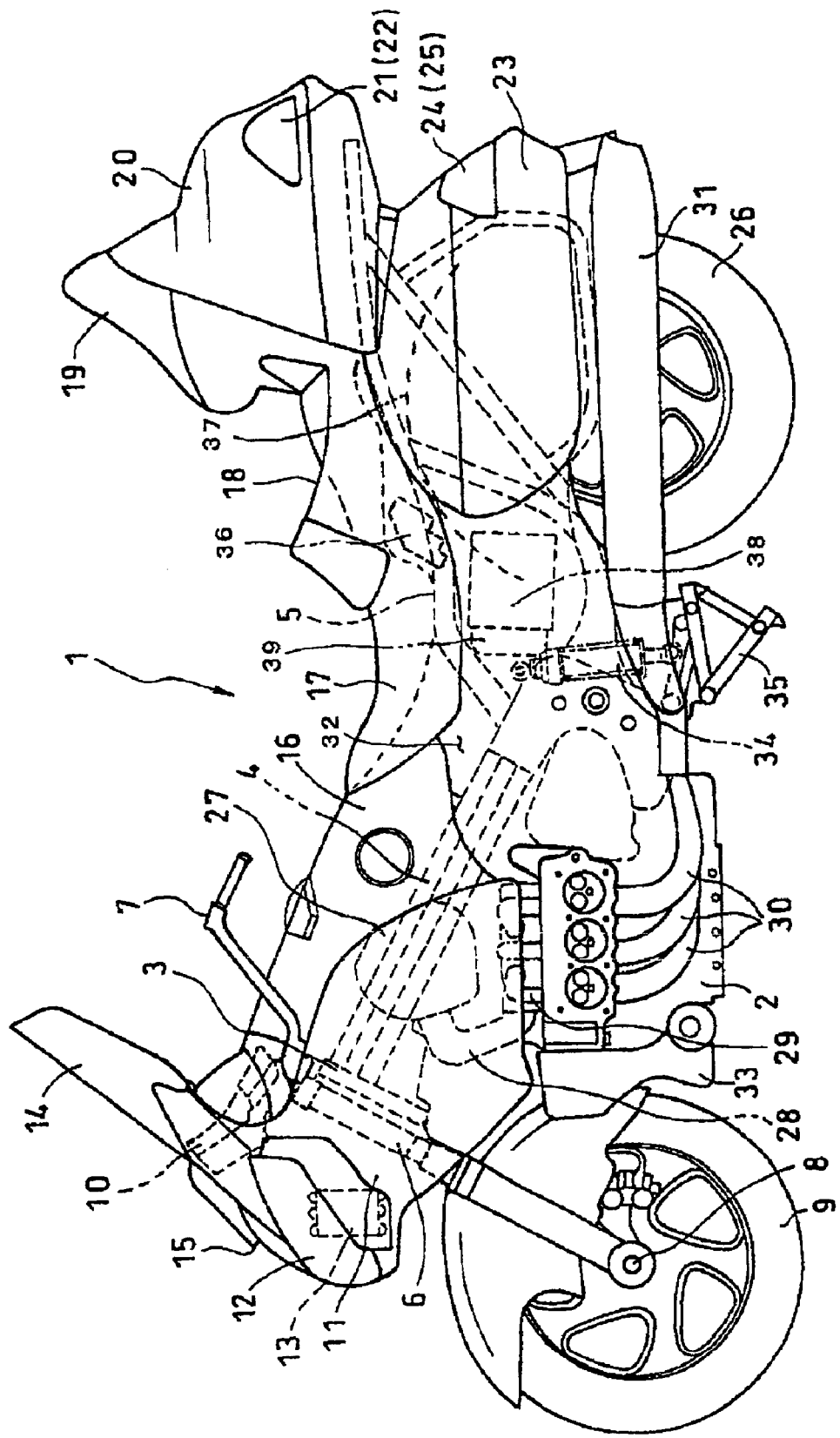
FIG. 2 is a side view of the motorcycle.

An embodiment of the present invention will now be described with reference to the drawings. FIG. 2 is a side view showing an appearance of a motorcycle on which is mounted a vehicular relay box embodying the invention. In FIG. 2, a motorcycle (hereinafter referred to as the "vehicle") 1 carries a horizontally opposed six-cylinder engine 2 and a frame structure thereof is constituted of a twin frame type main frame 4 extending in a bifurcated form backward of the vehicle from a steering head 3 and a rear frame 5 connected to and extending backward from the main frame 4. In the steering head 3 is mounted a front fork 6 pivotally and steerably, the front fork 6 comprising two pipes disposed right and left in a vehicular running direction. A handlebar 7 is fixed to the top of the front fork, that is, to a top bridge. A front axle 8 is secured to a lower end of the front fork 6 and a front wheel 9 is supported rotatably on the axle 8.

A display unit comprising a display panel and a control section, i.e., a meter unit 10, is provided in front of the handlebar 7. A lens 12, which is a clear lens, of a lamp device is mounted in front of a front fairing (cowl) 11 which covers a front portion of the vehicle 1. Inside the front cowl 11 is accommodated a voltage increasing device (ballast) 13 of an electric discharge lamp which is used as a lamp device.

A windscreen 14 is mounted above the front cowl 11 and an air inlet 15 is formed near the mounted portion of the windscreen 14.

A fuel tank 16 is mounted on the main frame 4. Behind the fuel tank 16 and on the rear frame 5 are mounted a rider seat 17 and a pillion 18. The pillion 18 is integral with the rider seat 17 and has a back rest 19. Behind the back rest 19 is provided a rear trunk 20. In a rear portion of the rear trunk 20 are mounted rear strap lamps 21 and turning signal lamps 22. Below the rear trunk 20 and on the right and left sides of a rear wheel 26 are provided side trunks 23, and in rear portions of the side trunks 23 are provided another pair of rear strap lamps 24 and another pair of turning signal lamps 25.

An air cleaner 27 is mounted below and in front of the fuel tank 16 and a throttle body 28 is mounted in front of the air cleaner 27, with intake manifolds 29 extending downward from the throttle body 28. The intake manifolds 29 are connected to three cylinders disposed opposedly on the right and left sides of the vehicle body. Upstream of each of the cylinders is disposed a fuel injector (not shown). Exhaust manifolds 30 are drawn out backward from the engine 2 and are connected to mufflers 31.

Both right and left sides of the rider seat 17 are covered with side covers 32 and a front lower cowl 33 is disposed in front of the engine 2. A relay box 36 is disposed below the rider seat 17 and along a rear fender 37. The relay box 36 is mounted on the rear fender 37.

A battery 38 is mounted below the relay box 36 and on the left-hand side of the vehicle body, and a fuse box 39 is disposed in front of the battery 38. The battery 38 is mounted on a support frame (see FIG. 1) suspended from the rear frame 5 and the fuse box 39 is screwed to the support frame.

Further, a rear cushion 34 is disposed below the rider seat 17. The rear cushion 34 is connected to a hydraulic unit (not shown) which can adjust the spring force electrically and which thereby can adjust an initial suspension load in accordance with the weight of the rider. The vehicle 1 can be allowed to stand up with use of a stand 35.

Figure 1:
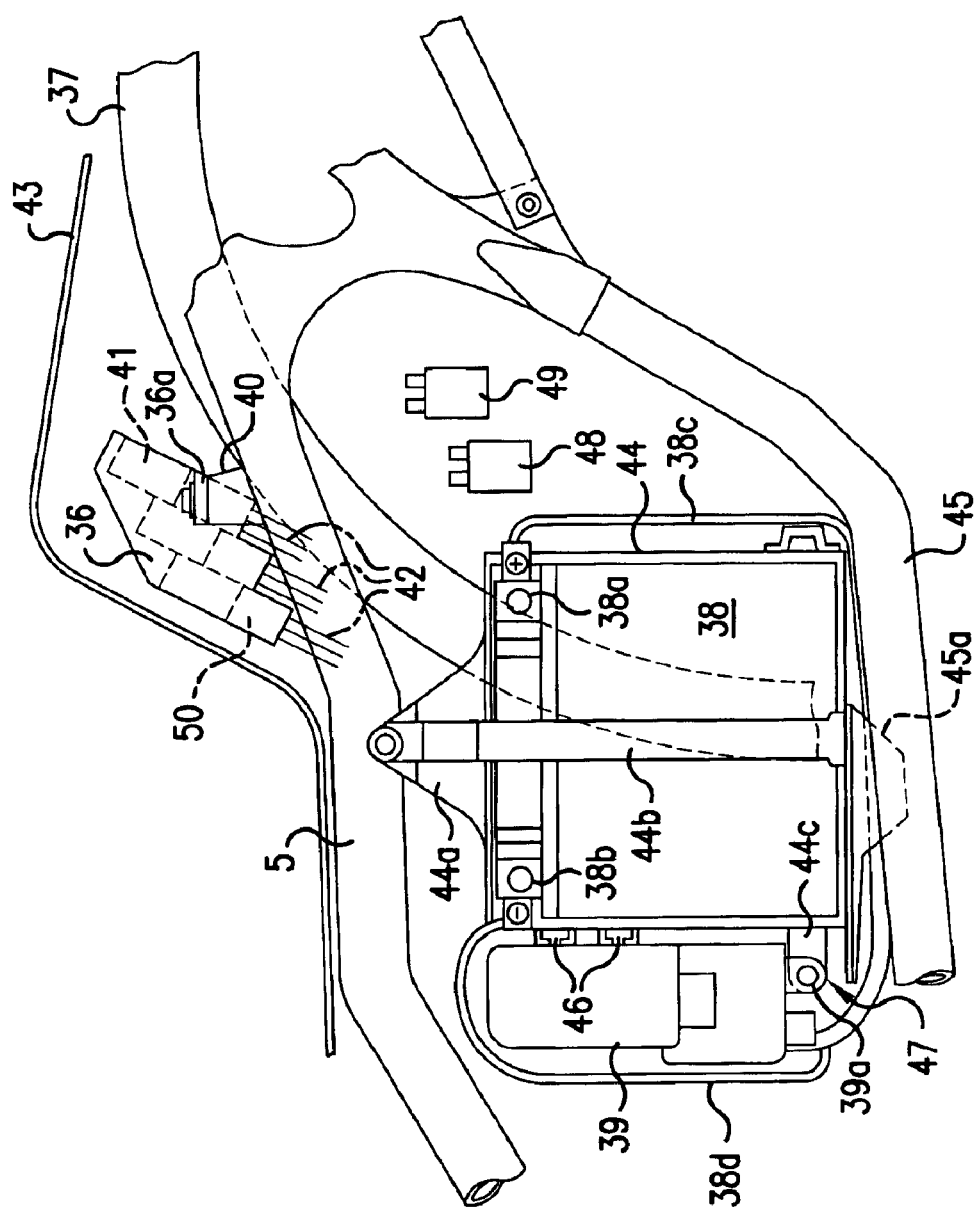
FIG. 1 is an enlarged view of principal portions of a motorcycle on which is mounted a relay box according to an embodiment of the present invention.

The following description is now provided about the layout of both relay box 36 and fuse box 39. FIG. 1 is a side view of principal portions located near the rear fender of the motorcycle. In FIG. 1, the relay box 36 is disposed at a position slightly shifted to the front side from the top of the rear fender 37 and it has mounting plates 36a projecting nearly horizontally from both side faces thereof. On the other hand, the rear fender 37 is provided with bosses 40 having mounting surfaces respectively which are opposed to the mounting plates 36a of the relay box. The bosses 40 have bolt holes, to which the mounting plates 36a are bolted to fix the relay box 36. Within the relay box 36 are arranged a large number of relays 41 as component parts in such a multi-stage fashion as shown in FIG. 1. Conductors 42 are drawn out respectively from the relays 41 along the rear fender 37. As is seen from FIG. 1, the relay box 36 is disposed by effectively utilizing the space formed between the rear fender 37 and a seat bottom plate 43. The conductors 42 are connected to the fuse box 39.

On the other hand, the battery 38 is mounted on a battery support frame 44 below the relay box 36 and on the left-hand side of the vehicle body. An upper portion of the support frame 44 is suspended from the rear frame 5 through a bracket 44a and a lower portion thereof is supported by a lower frame 45 through a lower bracket 45a, the lower frame 45 extends rearwardly from the main frame 4. Further, the battery 38 is fixed to the support frame 44 with a band 44b stretched between the bracket 44a and the lower frame 45.

The fuse box 39 is supported on the front side of the support frame 44. The fuse box 39 is engaged with the support frame 44 at both upper hook portions 46 and a lower clamp portion 47. The upper hook portions 46 comprise groove-like projections formed on the support frame 44 and projections formed on the fuse box 39 side. The lower clamp portion 47 comprises a plate 44c formed on the support frame 44 and an overhanging portion 39a formed on the fuse box 39 side and bolted to the plate 44c.

Cables 38c and 38d connected respectively to a positive terminal 38a and a negative terminal 38b are introduced from below the fuse box 39 into the fuse box and are connected to internal screw terminals which will be described later. Further, magnet switches 48 and 49 of a large capacity for opening and closing a circuit including a starter motor (not shown) are disposed at obliquely rearward positions (near the rear portion of the vehicle body) with respect to the battery 38. The magnet switches 48 and 49 are supported by the rear frame 5 through a mounting member (not shown) and are connected through cables (not shown) to screw terminals in the interior of the fuse box 39.

Figure 3:
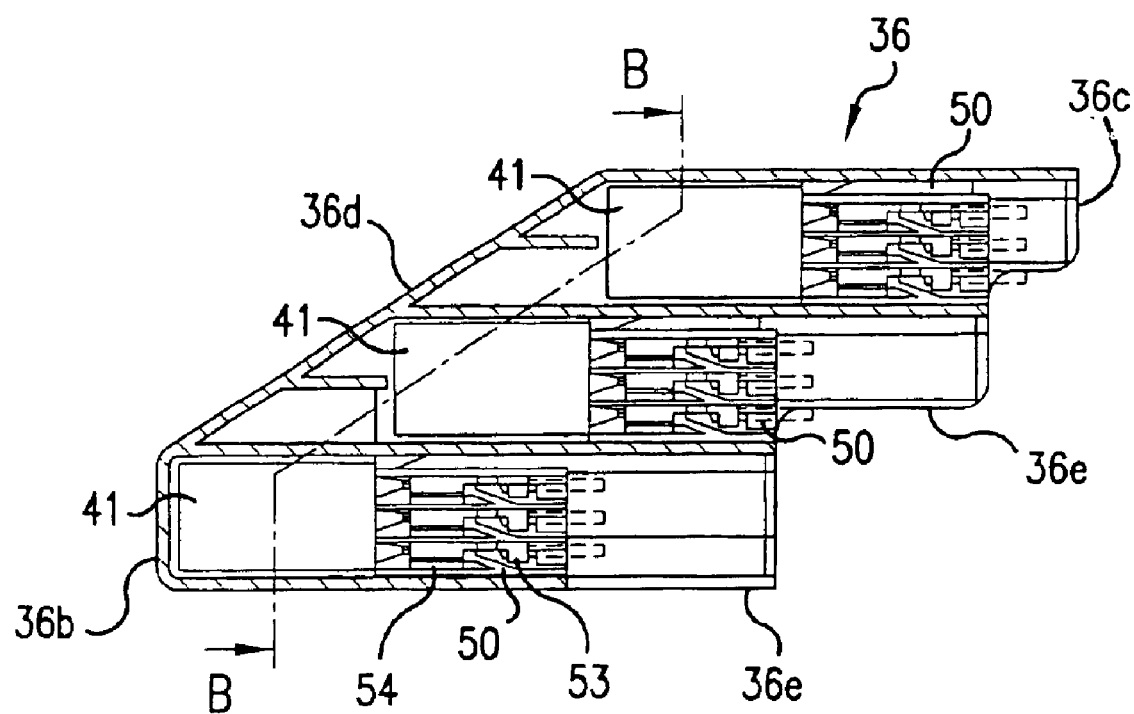
FIG. 3 is a sectional side view of the relay box.
Figure 4:
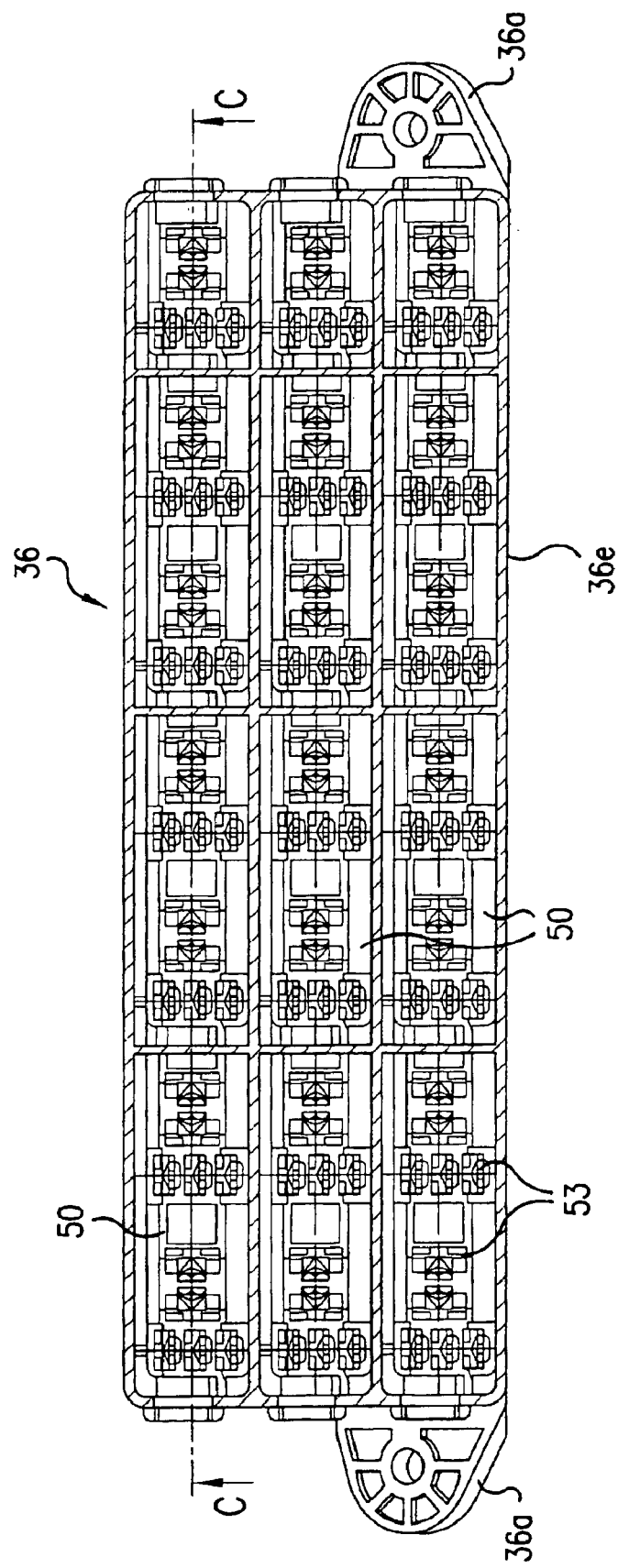
FIG. 4 is a sectional view taken on line B—B in FIG. 3.
Figure 5:
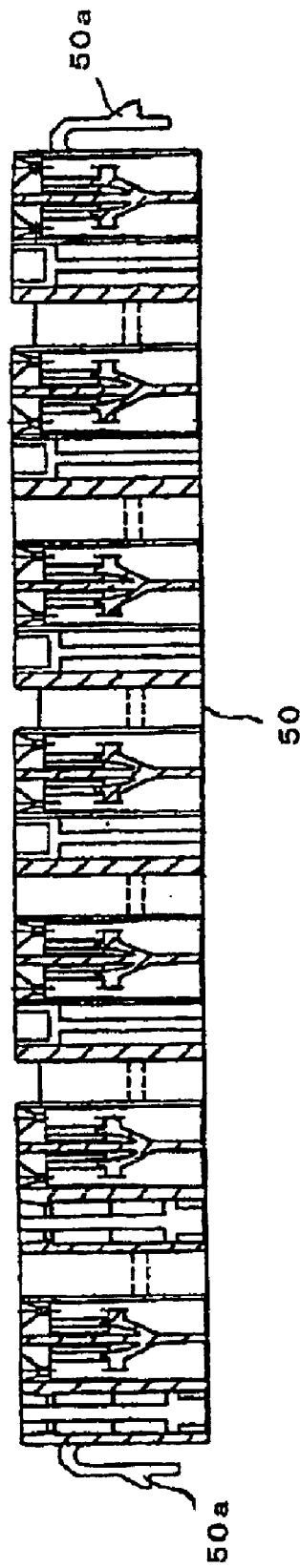
FIG. 5 is a sectional view taken on line C—C in FIG. 4.

FIG. 3 is a sectional view of the relay box 36, FIG. 4 is a sectional view taken on line B—B in FIG. 3, and FIG. 5 is a sectional view of a relay substrate 50 taken on line C—C in FIG. 4. FIG. 3 illustrates a housing, said housing including an upper surface 36b and a lower surface 36c, an inclined connecting surface 36d or securing a first end of said upper surface 36b to a first end said lower surface 36c, and a stepped connecting wall 36e for securing a second end of said upper surface 36b to a second end of said lower surface 36c, and the substrates 50 mounted in a stepped arrangement along said stepped connecting wall 36e in a stepped manner. FIG. 4 illustrates a state wherein the relays are removed. Hooks 50a for engagement with the relay box 36 are formed at both longitudinal ends of the relay substrate 50.

The relay box 36 is provided with the relay substrate 50 which is a long substrate and which supports the plural relays 41 in common. In FIG. 3, three such relay substrates 50 are arranged vertically in three stages. As can be seen in FIG. 3, the relay substrates 50 are respectively provided with socket terminals 53 for connecting plural connecting terminals 54 (plugs) of the relays 41 together. Seven relays 41 are mounted on each relay substrate, that is, a maximum of twenty-one relays 41 are mounted within the relay box 36. The relay substrates 50 are shifted away from, or offset from one another in a dismounting direction of the relays 41, like stair steps (FIG. 3).

Thus, as is illustrated in FIG. 3, the relay box 36 is generally in the shape of a parallelogram in side view and therefore can be installed suitably even in a complicated and narrow space defined by non-planar wall surfaces, such as the space between the rear fender 37 and the bottom plate of the seat. It goes without saying that the number of relays 41 received within the relay box 36 is not limited to the one adopted in this embodiment, insofar as relay substrates each supporting plural relays in common are provided in plural stages and are shifted from one another so as to match the shape of an installing space.

Figure 6:
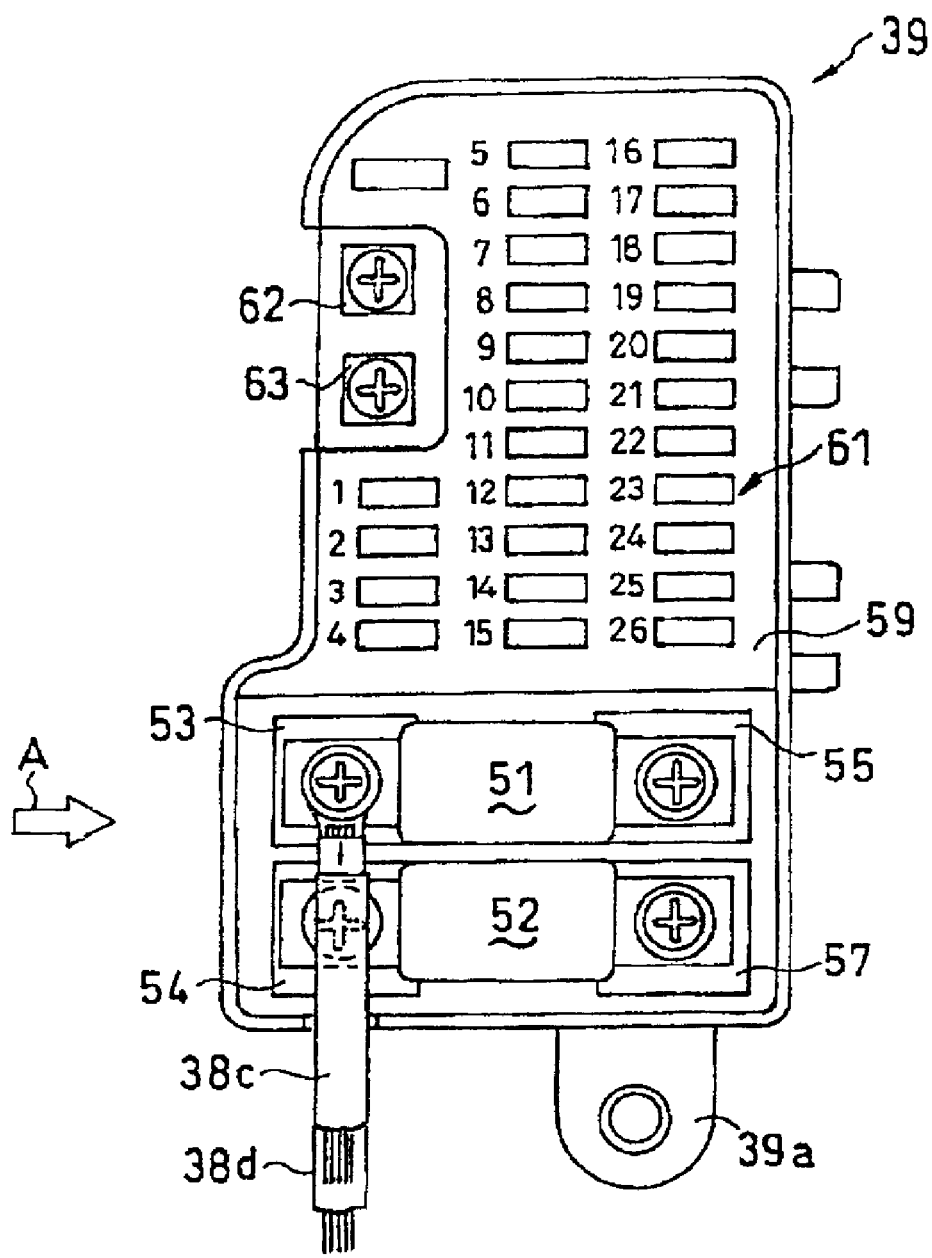
FIG. 6 illustrates a fuse box with a surface cover removed.
Figure 7:
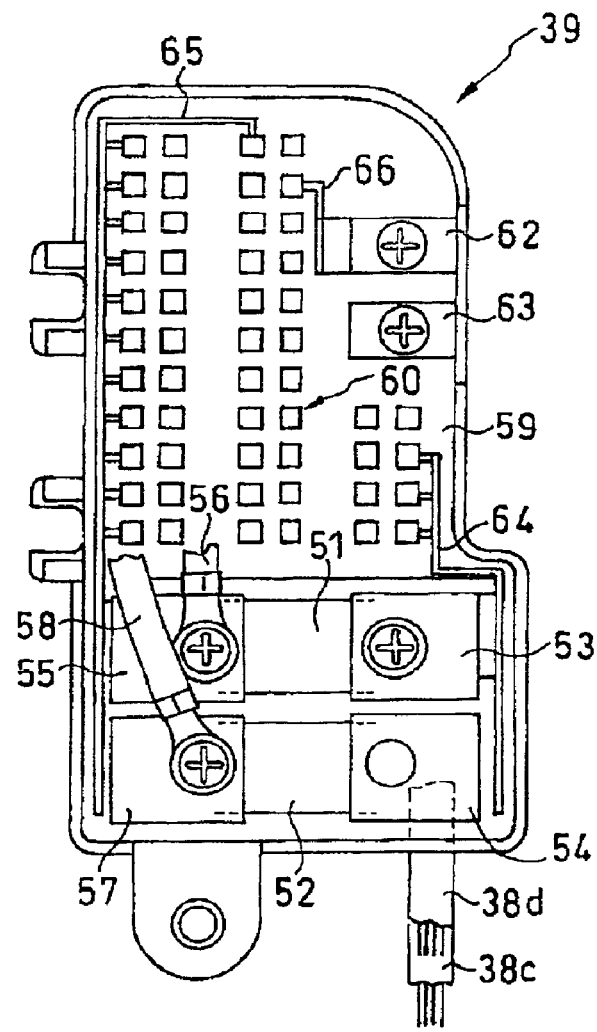
FIG. 7 illustrates the fuse box with a back cover removed.
Figure 8:
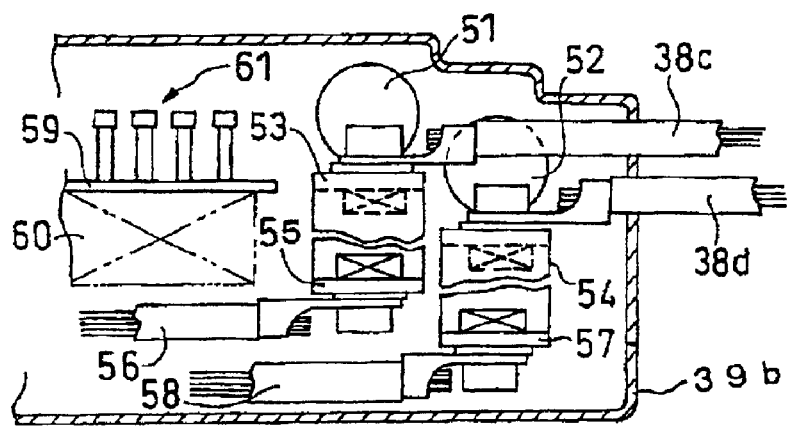
FIG. 8 is a sectional view of principal portions of the fuse box.
Figure 9:
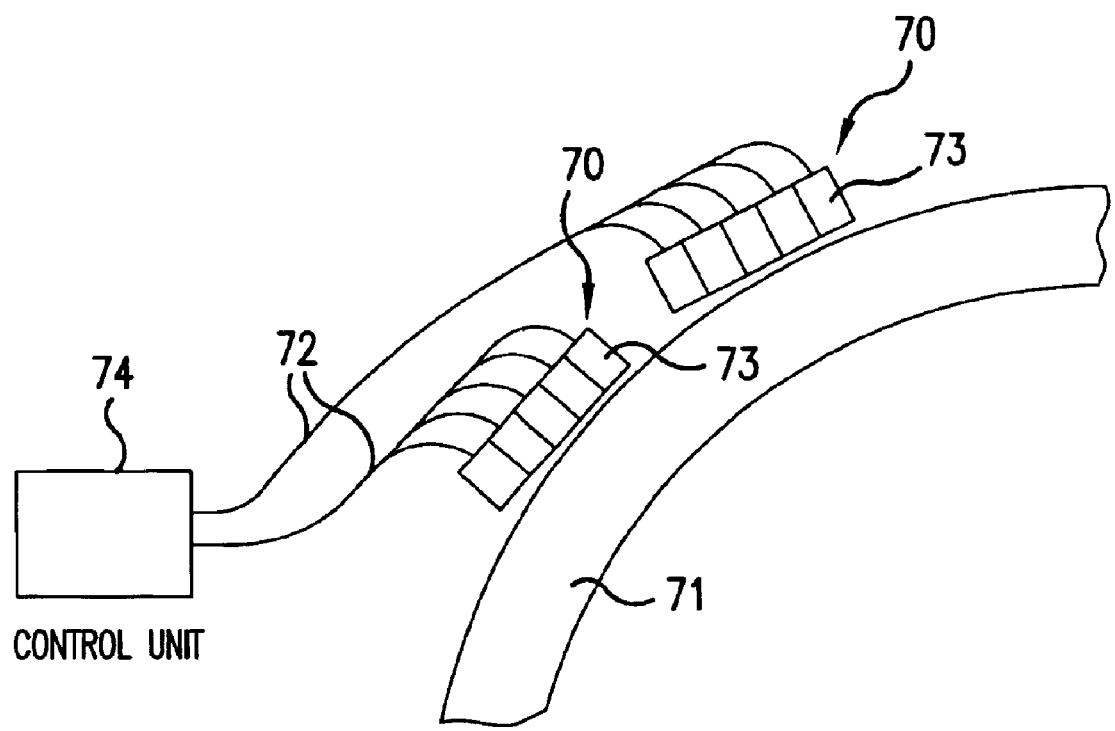
FIG. 9 is a schematic diagram showing an example of layout of a conventional relay box.

FIG. 6 illustrates a layout of fuses with a surface cover (a cover mounted on the left-hand side of the vehicle body) of the fuse box 39 removed, FIG. 7 illustrates a layout of fuses with a back cover of the fuse box removed, and FIG. 8 is a sectional view of principal portions as seen in the direction of arrow A in FIG. 6. In a lower position of the fuse box 39 are disposed block fuses 51 and 52, which are each constituted of a cylindrical body and terminals connected thereto. The terminals of the block fuses 51 and 52 are respectively screwed to terminal boards 53, 55 and terminal boards 54, 57. One end of the block fuse 51 is screwed to the terminal board 53 together with cable 38c which is connected to the positive terminal of the battery 38, and one end of the block fuse 52 is screwed to the terminal board 54 together with cable 38d which is connected to the negative terminal of the battery 38. Further, cable 56 is screwed to the terminal board 55 to which is connected the opposite end of the block fuse 51, and cable 58 is screwed to the terminal board 57 to which is connected the opposite end of the block fuse 52.

A plurality of fuse plug-in terminals 60 are provided on a substrate 59 and blade fuses 61 are inserted into the plug-in terminals 60. A positive terminal board 62 and a negative terminal board 63 both for accessory purpose are provided on the substrate 59. Bus bars 64 and 65 are connected to the terminal boards 53 and 55, respectively. Further, a bus bar 66 is connected to the positive terminal board 62 for accessory. The bus bars 64, 65 and 66 are connected respectively to predetermined ones out of plug-in terminals 60.

The cable 56 is connected to the positive terminal board 62 for accessory and the cable 58 is connected to the negative terminal board 63 for accessory. The positive side is connected to the magnetic switches 48 and 49 through the positive terminal board 62 for accessory. Conductors connected to the blade fuses 61 are drawn out to the side opposite to the battery 38 from a hole formed in a side wall of the fuse box 39.

As shown in the figures, the block fuses 51 and 52 are arranged in line so that the respective screw portions for the terminal boards 53 and 54 are positioned along the wall surface of the fuse box 39. Therefore, the cables 38c and 38d, which are drawn out from the screw portions so as to perpendicularly intersect the longitudinal direction of the block fuses 51 and 52, are superimposed one on the other when seen in plan as in FIG. 7. Actually, however, since the mounting surfaces of the block fuses 51 and 52 are different in height (see FIG. 8), the cables can be drawn out downward of the fuse box 39 without any obstacle.

Likewise, although the cables 56 and 58 are drawn out in the same direction, since their mounting surfaces are also different in height, the cables can be connected, without mutual interference, to the positive and negative terminals 62, 63 for accessory through the interior of the fuse box 39. Particularly, the mounting surfaces for mounting the cables 56 and 58 to the terminal boards 55 and 57 are stepped in the vicinity of the wall surface (back cover 39b) of the fuse box 39 with respect to the substrate 59 on which are mounted plug-in terminals 60 of the blade fuses 61, so that here again there is no interference with peripheral members which are mounted in association with the plug-in terminals 60.

As set forth above, in the configuration wherein cables are screwed to block fuses 51 and 52 as circuit components and are drawn out in the same direction, the mounting surface of the circuit component (block fuse 52 in this embodiment) intersecting the screw portion of the other circuit component is set lower than the mounting surface of the other circuit component (block fuse 51). By so doing, the cables which are screwed to the mounting surfaces together with fuses do not interfere with each other. This is not limited to the arrangement of two block fuses. Also in the case of using a larger number of block fuses, a mutual interference of cables connected to screw portions can be prevented by setting the mounting surface of a circuit component intersecting a larger number of screw portions lower than those intersecting less screw portions.

The fuse box with fuse mounting surfaces set as above is suitable particularly for a motorcycle having subdivided circuits, a larger number of fuses and a limited mounting space.

As will be apparent from the above description, according to the present invention, since component parts are arranged in plural stages in a stepped manner like stairs, it is possible to form a corner portion of the box at an acute angle. Consequently, a large number of component parts such as relays can be concentrated in a space having a narrow corner such as a space where a fender of a motorcycle and a member adjacent thereto intersect each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A component parts box for a vehicle containing a plurality of component parts comprising:

a substrate having at least a first row, a second row, and a third row, each of the rows having lengths extending laterally across the vehicle, the second row being arranged in a stepped down manner from the first row, and the third row being arranged in a stepped down manner from the second row;

a plurality of component parts being arranged in a line on each of the stepped rows of the substrate wherein connecting terminals of the component parts face the associated row; and a mounting plate disposed adjacent to each end of the first row of the substrate for mounting the component parts box onto the vehicle in an inclined position.

2. The component parts box for a vehicle according to claim 1, wherein the component parts are each provided with a plurality of connecting terminals, the connecting terminals being connected to the associated row.

3. The component parts box for a vehicle according to claim 1, each of the mounting plates being disposed at an inclined angle relative to the first row and being mounted on a substantially horizontal portion of the vehicle, thereby mounting the component parts box onto the vehicle in the inclined position.

4. The component parts box for a vehicle according to claim 1, wherein said plurality of components are relays, said relays being arranged in a line and being mounted on each of the rows.

5. The component parts box for a vehicle according to claim 1, wherein said component parts box includes at least one inclined surface with said the first row, the second row, and the third row are disposed in said stepped manner along an inner surface of said inclined surface.

6. The component parts box for a vehicle according to claim 1, and further including conductors connected to each of said rows, each of said conductors being disposed on a plane that is stepped relative to the conductors on the adjacent row for reducing the area required for connecting said rows to an electrical system of the vehicle.

7. A component parts box for a vehicle containing a plurality of component parts comprising:
 a housing, said housing including
  an upper surface and a lower surface,
   an inclined connecting surface for securing a first end of said upper surface to a first end said lower surface, and
   a stepped connecting wall for securing a second end of said upper surface to a second end of said lower surface, the stepped connecting wall joining the upper surface and the lower surface of the housing at angles that are substantially perpendicular;
 a plurality of substrates, said plurality of substrates being disposed in a stepped arrangement along said stepped connecting wall in a stepped manner; and
 a plurality of component parts being arranged in a line on each of the substrates.

8. The component parts box for a vehicle according to claim 7, wherein the component parts are each provided with a plurality of connecting terminals, the connecting terminals being connected to the associated substrate.

9. The component parts box for a vehicle according to claim 7, wherein three substrates are positioned within said components parts box, a first substrate being arranged is a first predetermined position, a second substrate disposed adjacent to said first substrate and being displaced relative to said first substrate, and a third substrate being disposed adjacent to said second substrate and being displaced relative to said second substrate.

10. The component parts box for a vehicle according to claim 7, wherein said plurality of components are relays, said relays being arranged in a line and being mounted on each of the substrates.

11. The component parts box for a vehicle according to claim 7, wherein with said plurality of substrates being disposed in said stepped manner along an inner surface of said inclined surface.

12. The component parts box for a vehicle according to claim 7, and further including conductors connected to each of said substrates, each of said conductors being disposed on a plane that is stepped relative to the conductors on the adjacent substrates for reducing the area required for connecting said substrates to an electrical system of the vehicle.

13. The component parts box for a vehicle according to claim 1, further including hooks at longitudinal ends of each of the substrates for engaging with the component parts box.

14. The component parts box for a vehicle according to claim 7, further including hooks at longitudinal ends of each of the substrates for engaging with the component parts box.

15. The component parts box for a vehicle according to claim 7, further including a pair of mounting plates for mounting the component parts box onto a fender of the vehicle.

16. A component parts box for a vehicle, comprising:
 a plurality of component parts, the component parts being arranged in a stepped manner,
 wherein connecting terminals are provided on one side of each of the component parts, and
 wherein conductors are connected to the terminals, the conductors being led out of terminals in substantially a straight manner, and in a forwardly and downwardly slanted direction with respect to an upright direction.

17. The component parts box for a vehicle according to claim 16, further comprising:
 an inclined connecting surface on an upper side of the component parts box; and
 stepped lower surfaces on a lower side of the component parts box,
 wherein the conductors are led out from the lower surfaces of the component parts box.

18. The component parts box for a vehicle according to claim 17,
 wherein the conductors are led out from the lower surfaces of the component parts box and extend along a rear fender of the vehicle.

* * * * *